March 30, 1965 E. J. OCH ETAL 3,175,304
EDUCATIONAL DEVICE FOR TEACHING ELECTRICAL CIRCUIT
THEORY, FUNDAMENTALS, ELECTRONICS, AND THE LIKE
Filed May 12, 1961 2 Sheets-Sheet 1
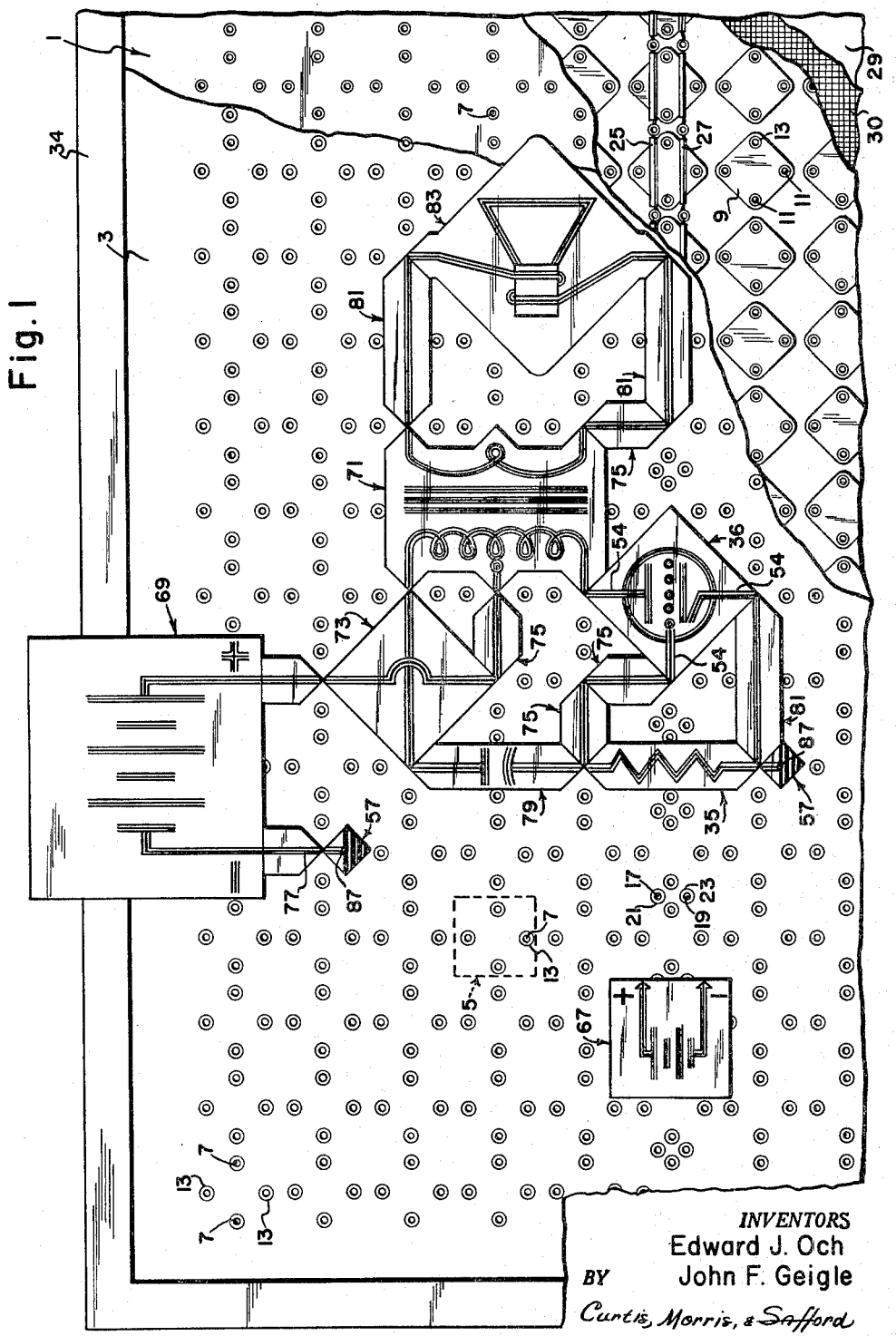
INVENTORS
Edward J. Och
BY John F. Geigle
Curtis, Morris, & Safford
ATTORNEYS

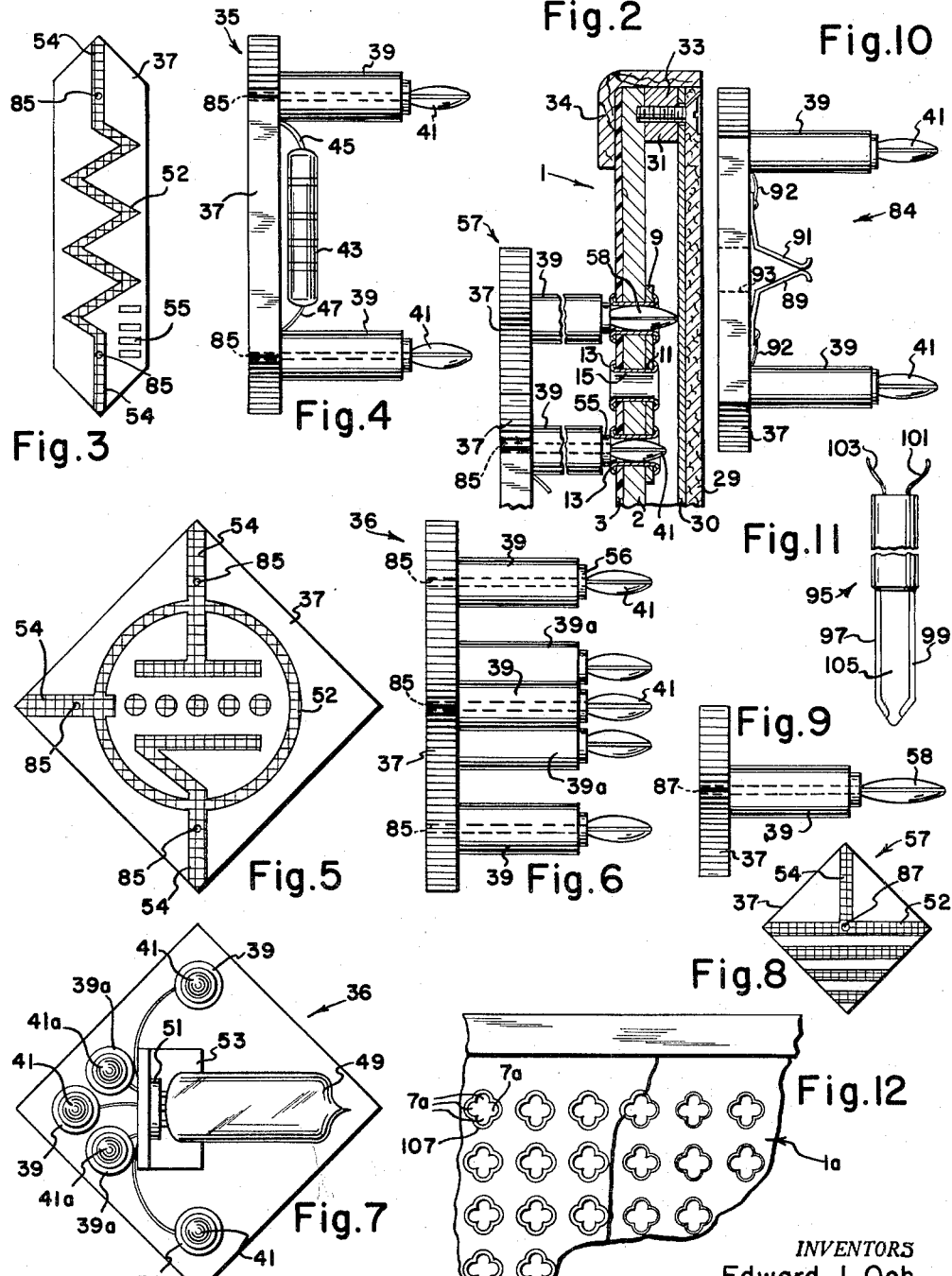

United States Patent Office 3,175,304
Patented Mar. 30, 1965

3,175,304
EDUCATIONAL DEVICE FOR TEACHING ELECTRICAL CIRCUIT THEORY, FUNDAMENTALS, ELECTRONICS, AND THE LIKE
Edward J. Och, 146—49 61st Road, Flushing, N.Y., and John F. Geigle, 1 Brookside Ave., Somerville, N.J.
Filed May 12, 1961, Ser. No. 109,628
9 Claims. (Cl. 35—19)

This invention relates to visual educational devices and, more particularly, to visual educational devices employed for teaching electrical circuit theory and fundamentals, electronics, and operating characteristics in practice to students while, at the same time, familiarizing these students with standard electrical symbolisms and enabling the instructor and students quickly and conveniently to construct electrical circuits of many different types for learning their characteristics and operation.

Visual educational devices can be employed to advantages by lecturers concurrently and in conjunction with oral description of electrical components, circuits and instrumentalities. It is requisite, therefore, that these devices be convenient to use and that they introduce a minimum of distraction both to the lecturer and the student body. Also, educational devices for electrical circuit theory should be easily and conveniently controlled by a lecturer and possess that degree of flexibility whereby any one of numerous electrical circuit instrumentalities can be operatively assembled, modified, reconstructed and demonstrated in full view of the student body.

Prior art visual educational devices for electrical circuits, however, are not fully satisfactory as they lack sufficient flexibility and ease of control so as to destroy lecture continuity. Accordingly, lecturers have heretofore usually found it necessary to assemble the specific electrical circuit instrumentality to be described on educational devices prior to the lecture, particularly when numerous components and interconnections are involved in assembling the circuit to be demonstrated. Moreover, educational devices of the prior art, even when fully assembled, very often are not in full and clear view of the student body nor easily modified to illustrate the effects of changes and of electrical components of varying magnitudes in the characteristics and operation of the electrical circuits and instrumentalities. Consequently, the full worth of visual educational devices has not been achieved by prior devices.

Accordingly, an object of this invention is to provide a visual educational device for teaching electrical circuit theory and electronics convenient and easy to use and possessing a very high degree of flexibility and ease of control.

Another object of this invention is to provide a visual educational device for students in courses on electrical theory and practice which simultaneously provides and completes a schematic diagram in full view of the student body of the particular electrical circuit instrumentality which it is being assembled or modified.

Among the many advantages of the teaching devices described herein as illustrative embodiments of this invention are those resulting from the fact that these teaching devices provide for easy and quick modification of the electrical circuits being demonstrated and the schematic circuit diagram is correspondingly modified in full and clear view before the students.

Another advantage of the visual educational devices described herein is provided by the fact that electrical connections are automatically established between the various electrical components as the electrical circuit instrumentality is assembled.

Another advantage of the devices described herein as illustrative of this invention is the provision of clear and easily seen circuit diagrams, and these devices have no exposed studs, posts or wire connections to interfere with the students' view or with the convenient assembly of the electrical circuit or instrumentality being constructed or demonstrated.

These and numerous other objects and advantages are achieved in accordance with one aspect of this inevntion by the provision of a substantially flat panel structure having a plurality of electrical junctions arranged in a repetitive, modular pattern with the various electrical junctions normally being insulated one from another. Each junction is defined by a predetermined pattern of spaced, electrically-interconnected contacts forming a common junction point. Electrical components for assembling an electrical circuit instrumentality are contained in module plug-in units having engageable contact members each corresponding to and electrically integral with a terminal of the electrical component in the module unit. The engageable contact members of each module are selectively spaced so as to extend between the respective contacts of the various junctions on the panel structure. Each module, therefore, can be conveniently mounted on the panel structure and between the contacts of a pair of junctions in one swift movement by the lecturer. Thus, the respective electrical component is placed in circuit connection between the different junction points and electrical connections are automatically established between the terminals thereof and of other electrical components in other modules which are placed on the panel structure and have their corresponding contacts also in engagement with the same junction.

In the illustrative embodiments of the invention described herein, each module has a substantially flat upper-surface or platform which is mitered so as to join in a common plane with the platforms of other modules at the same junction. A schematic or symbolic representation of the particular electrical component contained in a module is illustrated on and extends to the apexes of this platform. Accordingly, schematic representations supported on the platforms of all modules secured at the same junction point appear continuous. As the electrical circuit instrumentality is constructed, therefore, a schematic representation is concurrently formed in full view of the student body.

In the illustrative examples of the invention, pairs of electrical contacts are provided on the panel structure in addition to the aforesaid patterns. Corresponding ones of these pairs of contacts are electrically interconnected and provide signal "tap-off" connections over the plane of the panel structure. Particular ones of the plug-in modules are provided with pairs of engageable contacts spaced to extend between these tap-off contacts. Signals as desired may be directed into or out of the electrical components contained therein while desirably avoiding any exposed wire connections.

Therefore, the novel apparatus described herein as embodying this invention provides highly desirable visual educational devices wherein operative electrical circuits and instrumentalities are conveniently assembled in step-by-step fashion and schematic diagrams thereof concurrently completed in full view of the student body. Not only are the various modules firmly mounted on the panel member, but also electrical connections between the respective electrical components contained therein are immediately and positively effected with a minimum of distraction to the lecturer and the student body. The electrical circuit instrumentality, when assembled, is immediately available for demonstration or further modification as may be desired.

In this specification and in the accompanying drawings are described and shown visual educational devices for teaching electrical circuit theory and fundamentals, electronics, and operating characteristics as embodiments of the present invention and various modifications thereof are indicated, but it is to be understood that these examples are not intended to be exhaustive nor limiting of the invention, but, on the contrary, are given for purposes of illustration in order that others skilled in the art may fully understand the invention and the manner of applying the devices for educational purposes so that they may modify and adapt various forms, each as may be best suited to the conditions of a particular use.

A fuller understanding and appreciation of the various objects, aspects and advantages of this invention may be obtained from a consideration of the description hereinafter set forth in conjunction with the following drawings wherein:

FIGURE 1 shows a top view, partially cut away, of a visual educational device embodying this invention and having an assembled electronic circuit with loudspeaker output;

FIGURE 2 is a partial, cross sectional view of the visual educational device of FIGURE 1 shown on enlarged scale and illustrating a pair of modules engaged and electrically interconnected at a common junction;

FIGURES 3 and 4 show top and side views, respectively, of a plug-in module containing a resistor element;

FIGURES 5, 6 and 7 show top, side and bottom views, respectively, of a module containing a triode vacuum tube;

FIGURES 8 and 9 show top and side views, respectively, of a module for establishing a common return or "ground" connection in the visual educational device;

FIGURES 10 and 11 show a test probe arrangement which may be employed with the visual educational device of FIGURE 1; and FIGURE 12 shows a modified visual educational device embodying the present invention.

As illustrated in FIGURES 1 and 2, a visual educational device embodying this invention for teaching electrical circuit theory and fundamentals, electronics, and operating characteristics includes a flat panel member 1 with a front surface 3 having a plurality of electrical junctions 5 thereon arranged in a repetitive modular pattern, with the various junctions 5 being normally insulated one from another. In this example, the panel member 1 includes a non-conductive backing layer 2, for example, of plywood, of compressed fiber wallboard, etc., laminated with an attractive front surface veneer 3, for example, a surface material made with urea-formaldehyde resins, e.g., "Formica" sheeting or methyl methacrylate sheeting, e.g., "Lucite" or "Plexiglas." As an alternative construction, a thick rigid layer of the surface material 3 can be used to form the panel member 1 as an integral, non-laminated structure without the backing layer 2.

The electrical junctions 5 each comprise a predetermined pattern of engageable contact apertures 7 arranged in rows and columns over the face of the panel member 1. As hereinafter fully described, each junction pattern 5 of contact apertures 7 serves as a common junction point on the visual educational device at which a plurality of electrical interconnections between the various components, for example four, of an electrical circuit instrumentality are easily and positively established.

A plurality of electrically insulated metallic junction plates 9 are secured to the rear surface of the panel member 1, each plate 9 corresponding to one of the junction patterns 5 and including a pattern of apertures 11 identical therewith. These plates 9 are secured against the rear face of the panel member by hollow metal rivets 13. The rivets 13 extend through corresponding apertures 7 and 11 and are crimped to form the inner conductive walls 15 along the apertures 7 (see FIGURE 2); thus, the contact walls 15 in each of the junctions 5 are electrically interconnected through the corresponding junction plate 9. In various devices other alternative interconnections may be employed between the engageable contact apertures 7 in lieu of the junction plates 9; for example, printed-type conductive layers, wire jumpers, etc., may be used to connect the various contact walls 15 of each junction 5 as will be understood.

In addition, pairs of spaced engageable contact apertures 17 and 19 are distributed over the face of the panel member 1. Hollow metal rivets 21 and 23, positioned and crimped in each of the apertures 17 and 19, respectively, are electrically connected by means of insulated wire jumpers 25 and 27, respectively. As hereinafter described, electrical signals introduced at one pair of contact apertures 17 and 19 are directed along the jumpers 25 and 27 over the plane of panel member 1 to be "tapped-off" selectively at other pairs of apertures 17 and 19.

The panel member 1 is supported from a non-conductive back panel 29 by spacers or support posts 31. A conductive contact layer 30 is positioned on the front face of the back panel 29 and is coextensive with the panel member 1. This contact layer 30 may be formed either of a continuous sheet or of screen material, as shown in the cut-away portion of FIGURE 1. As hereinafter more fully described, the conductive sheet 30 serves to interconnect selected ones of the above-defined junctions 5 to a common return or "ground" connection. The back panel 29, the conductive sheet 30, the spacer 31, and the panel member 1 are secured by bolts 33. The resulting structure so formed is contained in a wood frame 34 and may be vertically positioned in full view of the student body.

The various electrical components for assembling an electrical circuit instrumentality on the panel member 1 are contained within module plug-in units 35 and 36 of the type illustrated in FIGURES 3 through 7. Each module unit includes a flat platform 37 having mitered ends and supported on stand-off posts 39 corresponding one to each active terminal of the particular electrical component contained in the module. The stand-off posts 39 support on their exterior ends electrical contacts 41 adapted to engage in the contact apertures 7 of the panel and shown, for example, as "banana" jacks. These "banana" jacks 41 are dimensioned to be inserted and securely retained in electrical contact within the inner wall 15 of an aperture 7. The particular electrical component, for example, the resistor element 43 of FIGURE 4, is mounted between the stand-off posts 39 with the terminal leads of the electrical component, for example, the leads 45 and 47 of the resistor element 43, being electrically connected to the respective contact jacks 41.

Module plug-in units are provided for circuit components, whether electrical or electro-mechanical, having two or more active terminals. For example, the module 36 of FIGURES 5, 6 and 7 is well suited for supporting a circuit component having more than two active terminals, for example, such as a vacuum triode tube 49, having plate, grid, cathode and two cathode heater terminals. As shown, the tube component 49 is supported horizontally beneath the platform 37 in a tube socket 51 mounted in a bracket 53. The socket pins corresponding to the plate, grid and cathode terminals of the triode 49 are electrically connected through respective leads to the contact jacks 41 on the stand-off posts 39. The socket pins corresponding to the two cathode heater terminals are electrically connected with a pair of contact jacks 41a on a pair of stand-off posts 39a, respectively, hereinafter described.

Considering FIGURES 4, 6 and 7, the stand-off posts 39 of each of the module units 35, 36 are selectively spaced so that the respective contact jacks 41 are simultaneously insertable in modular plug-in fashion into the more closely spaced ones of the contact apertures 7 of the different junctions 5 being utilized, as the case may be. This spacing allows the particular module to be swiftly and securely mounted between selected junction points on the educational device in a single convenient motion, which simultaneously provides the mechanical support and provides the electrical connection together with the creation of a visual display of the circuit diagram. Accordingly, the electrical component contained in the particular module is placed in immediate, positive circuit connection between the selected junctions and in circuit relationship with other electrical components contained in other modules mounted at the selected junctions 5.

The platforms 37 of each module are mitered, as shown, to minimize the necessary spread of the apertures 7 in each junction pattern 5 while increasing the number of available junctions on panel member 1. As each of the stand-off posts 39 are of equal length, the platforms 37 of the various modules mounted at a same junction point do not overlap, but, rather abut along their mitered edges to form a continuous, exposed, plane surface parallel with the panel member 1 (see FIGURE 2). By providing a symbolic representation 52 on the upper face of platforms 37 of the component mounted within the respective module unit, a schematic diagram of an electrical circuit instrumentality is concurrently formed as such instrumentality is conveniently assembled in step-by-step fashion. The symbolic representation 52, for example, as shown in FIGURES 3 and 5, includes lines 54 which represent conductive connections or leads extending to the apexes of the mitered platforms 37. Thus, advantageously, all of the connections in the schematic diagram being formed appear as continuous lines to the student body.

Also, the electrical values of the various electrical components, for example, ohms, microfarads, millihenries, can be further identified and displayed to the student body by "color-coded" markings, such as the color-coded marking 55 showing the resistance value in ohms of the resistor 43 in the module unit 35. In addition, these symbolic representations 52 and connection lines 54 serve to indicate the proper orientation of the module units when mounted onto the panel member 1.

When a module unit such as the units 35 and 36 are mounted on panel member 1, the contact jacks 41 and 41a do not extend sufficiently far to contact the conductive "ground" sheet 30. (See FIGURE 2.) The insertion movements of the contact jacks 41 and also 41a are limited by the collar portions 56 (see FIG. 6) of the respective stand-off posts 39 and 39a. However, to establish a "ground" or common return connection for the circuit instrumentality being formed on the panel member, there are provided module units 57 as shown in FIGURES 8 and 9. These modules 57 comprise a platform 37 with a "ground" connection schematic representation 52 on its upper surface and having a single stand-off post 39 mounting an elongated "banana" contact jack 58. When a "ground" connection module unit 57 is positioned in a contact aperture 7, the elongated contact jack 58 is of sufficient length to extend into contact with the conductive sheet 30. A positioning of these "ground" module units 57, as shown in FIGURES 1 and 2, at various junctions on the panel member 1, therefore, electrically connects each of these junctions to the common or "ground" potential on the conductive sheet 30.

The ease by which an electrical circuit instrumentality is assembled and modified by a lecturer in full view of a student body will be fully appreciated by referring again to FIGURE 1 wherein is shown a fully assembled oscillator circuit with loudspeaker output. The size and area of the platforms 37 of each module unit as shown are not limited by the physical dimensions of the electrical component mounted therein, and the schematic diagram thus viewed is sufficiently large to be seen by the entire student body.

The audio oscillator circuit of FIGURE 1 is completely self-contained in that all necessary voltage sources are also contained in individual plug-in module units and mounted on the panel member 1. Thus, advantageously, there are no exposed wires or leads. To provide additional support for those module units which contain circuit components of considerable weight, e.g. dry cell voltage sources or transformers, auxiliary stand-off posts, not shown, may be provided beneath the platforms 37 as will be understood.

The audio oscillator circuit of FIGURE 1 is shown as including a module unit 67 containing a filament voltage supply battery source. This plug-in unit 67 has a pair of stand-off posts, not shown, corresponding in spacing with the pair of posts 39a of the vacuum tube module 36. This filament supply unit 67 is positioned so that the respective "banana" jacks 41a, corresponding to and electrically integral with the positive and negative terminals, respectively, of the voltage supply, are secured within a pair of the contact apertures 17 and 19. During assembly, the module unit 36 containing the triode component 49 is positioned on the panel member 1 so that its contact jacks 41a are secured within another pair of the apertures 17 and 19, and thus the cathode heater is connected to the filament voltage battery through the tandem wire jumpers 25 and 27, respectively. The other contact jacks 41 of the tube module unit 36 engage within the more closely spaced ones of the contact apertures 7 of the particular junctions on panel member 1, being utilized, as described above.

Once the module 36 is positioned on the panel member 1, the extension lines 54 of the symbolic tube representation to the apexes of its platform 37 identify the various junction patterns 5 with which the respective plate, grid and cathode terminals of the triode component 49 are electrically connected. Appropriate electrical components are connected, as shown, to the active terminals of the triode 49 upon positioning of their respective module units at the identified junction points. The mitered ends of the platforms 37 and also the selective spacings of the stand-off posts 39 facilitate a positioning of the various modules on the panel member 1. In this step-by-step manner, the operative circuit of FIGURE 1 or any other electrical circuit instrumentality can be assembled easily and conveniently on panel member 1.

A module unit 69 containing a plate voltage supply battery is positioned on the panel member 1. This module unit 69 is operatively connected into the oscillator circuit between the common ground return 30 and the center-tap of the primary winding of an audio output transformer contained in a module unit 71 by means of connector module units 73 and 75. A connector module unit is one which provides a direct electrical connection between respective junction patterns and wherein the particular contact jacks 41 are directly connected as indicated by the schematic symbol thereon.

As illustrated, a "ground" circuit is established for the oscillator through the conductive sheet 30 by means of the "ground" module units 57 of the type shown in FIGURES 8 and 9. One of these ground units 57 is connected to the negative plate supply terminal at 77, and the other ground unit 57 is connected to the cathode of the tube through an elongated connector unit 81. However, if desired, a series of elongated connector units such as the unit 81 can be positioned on panel member 1 instead of using the ground connector units 57 to provide an electrical connection between the junctions corresponding to the negative terminal 77 of the plate voltage supply and the cathode. A module unit 35 containing a resistor provides the grid-bias resistor for the circuit, and a module unit 79 containing a capacitor provides positive feedback from the primary winding to the grid. A pair of the small connector units 75 connect the grid to the junction of the grid-bias resistor and the capacitor. The secondary winding of the transformer is connected through a pair of elongated connector units 81 and a smaller connector unit 75 to a module unit 83 containing a loudspeaker.

When the oscillator has been fully assembled, access is provided to each of the junctions through openings 85 (see FIGURES 3 through 6) cut through the respective platforms 37 of the various module units and aligned with the respective contact jacks 41. The individual slots 85 are positioned so that probes, not shown, can be inserted therein to sample electrical signals or to feed electrical signals into the circuit which has been assembled on the panel for demonstration purposes. Thus, the voltage of the various contact jacks 41 at the various junctions can be measured as displayed on an oscilloscope or electrical signals can be fed into the circuit being demonstrated to show their effects. When this is done, a corresponding "ground" probe is also inserted through an opening 87 cut through the platform 37 of one of the "ground" modules 57.

As an alternative means for sampling voltages or for feeding in signals, a test point module unit 84 of the type shown in FIGURE 10 is specifically provided for this purpose. This test point module 84 is generally similar to an elongated connector module, and it comprises, for example, a pair of silver-plated, copper spring contacts 89 and 91 which are electrically connected by leads 92 with respective "banana" jacks 41. A probe opening 93 cut through the platform 37 of this test point module 84 allows access for a probe 95 of the type shown in FIGURE 11. The probe 95 comprises, for example, a pair of spaced, insulated, silver-plated, Phosphor bronze contacts 97 and 99 connected to the respective leads 101 and 103. The contacts 97 and 99 are separated by a phenolic insulation material 105.

When the probe 95 is inserted through the hole 93, it forces the spring contacts 89 and 91 to separate and to make electrical contact with the contacts 97 and 99, respectively. Accordingly, test equipments connected between the leads 101 and 103 may be inserted easily and conveniently at any point in the electrical circuit instrumentality wherever a test point module 84 has been positioned. The student body, therefore, is taught testing and trouble shooting techniques simultaneously with an understanding of the purpose and operation of the individual circuit components.

As shown, the platforms 37 of the modules mounted at each junction do not overlap, but, rather are in smooth abutting relationship along their mitered edges. Accordingly, each module can be individually positioned onto or removed from the panel member 1 in a single action by a lecturer with a minimum of distraction. Also, any modification of the assembled circuit instrumentality is easily and rapidly effected by the convenient substitution of modules. In module units containing electrical components of a variable type, i.e. such as variable resistors, potentiometers, variable inductances and capacitances, the control stem therefor is extended through the platform 37 so as to be conveniently available on the exposed face of the module unit, as will be understood.

A modification of the panel member 1 is shown in FIGURE 12 wherein each junction is defined by a single hollow rivet 107 of clover-leaf or scalloped configuration providing a plurality of contact apertures 7A at each junction 107. The contact apertures 7A, like the apertures 7 of FIGURE 1, are selectively distributed in a modular arrangement, for example, in rows and columns over the modified panel member 1A. The stand-off posts 39 of the various plug-in modules, as hereinabove described, are spaced so as to be received and securely retained in clip-fashion between the closer spaced "leaves" or apertures 7A of selected junctions 107. In this embodiment, therefore, the various "banana" jacks 41 positioned at a same junction point are electrically interconnected along the inner conductive wall of a single rivet 107. In addition, the stand-off posts 39 are sector-like in cross section and are positioned at the mitered ends of the respective platforms 37, thus increasing the number of available junctions on panel member 1 while eliminating overlap of the respective platforms.

From the foregoing it will be understood that the visual educational devices for teaching electrical circuit theory, fundamentals, characteristics, and the like, embodying the present invention as described above are well suited to provide the advantages set forth, and since many possible embodiments may be made of the various features of this invention and as the apparatus described herein may be varied in various parts, all without departing from the scope of the invention, it is to be understood that all matter hereinbefore set forth or shown in the accompanying drawings is to be interpreted as illustrative and not in a limiting sense and that in certain instances some of the features of the invention may be used without a corresponding use of other features, all without departing from the scope of the invention as claimed hereinafter.

What is claimed is:

1. A visual educational device for teaching information about electrical circuits and components comprising a substantially flat panel member having a plurality of spaced electrical junctions thereon in a modular pattern, said junctions being insulated one from another, each of said junctions including a plurality of interconnected engageable electrical contact elements arranged in a predetermined pattern, a plurality of module units each including an electrical circuit component having its terminals electrically connected to a plurality of electrical contact members selectively spaced on the module unit for engagement with the contact elements of a plurality of said junctions, each module unit including a substantially flat platform defining a front surface of the module unit, a symbolic representation on said platform identifying the electrical component in the module unit, and lines extending from each symbolic representation to corresponding points on the edges of each of said platforms for simultaneously constructing a circuit and a schematic diagram of said circuit in the plane of said platforms when the contact members of said module units are engaged with the contact elements of said junctions with said module units in abutting relationship on said panel member.

2. A visual educational device for teaching electrical circuit theory, characteristics, and fundamentals comprising a substantially flat panel member having a plurality of electrical junctions supported thereon in a modular pattern, said junctions being insulated one from another and each of said junctions including a plurality of interconnected engageable contacts arranged in a predetermined pattern, a plurality of plug-in module units each having an electrical circuit component therein and at least two jack members extending therefrom, said jack members each being connected to a terminal of said component and each being insertable into a selected one of said engageable electrical contacts in pairs of said junctions for electrically interconnecting the component between selected ones of said junctions, a substantially flat upper surface on each module unit, a symbolic representation on said flat upper surface identifying said electrical circuit component in the module unit, and said symbolic representation having lines extending to corresponding positions on the edges of each of said flat upper surfaces for simultaneously constructing a circuit and a schematic diagram of said circuit in the plane of said flat upper surfaces when the jack members of said module units are inserted in said engageable contacts with said module units in contiguous relationship on said panel member.

3. A visual educational device as set forth in claim 2 further including a substantially flat, electrically conductive area member and means for supporting said conductive area member insulated from said flat panel member and in substantially parallel relationship spaced behind said flat panel member, and wherein particular ones of said plug-in units have at least one elongated jack member adapted to extend into engagement with said conductive area member for forming a common return circuit.

4. Visual educational apparatus for assembling electrical circuits and for teaching information about the electrical circuits comprising a panel member having a plurality of groups of contact apertures, the contact apertures in each group being arranged in the same pattern, each of said contact apertures having an inner conductive wall, means for electrically interconnecting the conductive walls of said apertures in each of said groups for providing a common interconnection among the contact apertures of each group, means for insulating each group of contact apertures from the other groups of contact apertures, a plurality of plug-in units each containing a circuit component, each unit having a jack member corresponding to and electrically connected to each terminal of the component in the unit, predetermined ones of said jack members in each unit being selectively spaced to fit within the respective contact apertures of different groups whereby engagement of said jack members in said contact apertures places the component in electrical circuit connection between the remaining apertures of said different groups, each of said units having an upper surface providing a symbolic representation of the component therein and having symbolic indications of electrical circuit leads extending out from the representation to corresponding points on the edges of the upper surfaces of each unit for simultaneously forming an electrical circuit and forming a schematic diagram of said circuit which appears in the plane of said upper surfaces when the jack members of said units are inserted into said apertures with the upper surfaces of said units in contiguous relationship on said panel member.

5. For use in visual educational apparatus for teaching electrical circuit theory by simultaneously building a schematic diagram of a circuit while at the same time assembling the actual circuit itself, a module unit having an electrical circuit component therein, a plurality of spaced engageable electrical contacts positioned behind the rear of said module unit, the terminals of said component being connected to respective ones of said engageable electrical contacts, said module unit having a planar front face on the opposite side from said contacts adapted to be viewed, said planar front face having mitered corners, a symbolic representation of said component on said front face and a symbolic indication of circuit lead lines extending out on said front face from the respective terminals of said component representation to the apexes of respective mitered corners of said front face, said electrical component and said engageable contacts being positioned entirely behind and being hidden by said front face and being entirely confined within the projected area of said front face, and the edges and apexes of the mitered corners of said front face being available and exposed for abutting flush against similar mitered corners of other module units.

6. A visual education device for teaching information about electrical circuits and components comprising a substantially flat panel member having a plurality of spaced electrical junctions thereon in a modular pattern, said junctions being insulated one from another, each of said junctions including four interconnected engageable electrical contact elements arranged in a square pattern, a plurality of module units each including an electrical circuit component having its terminals electrically connected to a plurality of electrical contact members selectively spaced on the module unit for engagement with the contact elements of a plurality of said junctions, each module unit including a substantially flat platform defining a front surface of the module unit, said platform having mitered corners, a symbolic representation on said platform identifying the electrical component in the module unit, and lines extending from each symbolic representation to respective mitered corners of each of said platforms for simultaneously contructing a circuit and a schematic diagram of said circuit in the plane of said platforms when the contact members of said module units are engaged with the contact elements of said junctures with said module units in contiguous relationship on said panel member.

7. A visual educational device as claimed in claim 6 wherein the square patterns of contact elements are positioned along orthogonal lines at an inclination of 45° with respect to the edges of the panel member.

8. Visual educational apparatus for teaching electrical circuit theory comprising a substantially flat panel member including a plurality of electrical junctions positioned thereon in spaced relationship in a modular pattern, each junction including a plurality of spaced interconnected contact regions in a predetermined pattern, means electrically insulating said junctions one from another, a plurality of jumper contacts at points spaced along said panel member, and an electrical jumper interconnecting said jumper contacts, a plurality of module units each of the same height and each having an electrical circuit component therein, a plurality of spaced engageable electrical members thereon, the terminals of said component being connected to respective ones of said engageable electrical members, each module unit having a flat front face adapted to be viewed and a symbolic representation of said component on said front face, the front face of each module unit having edges, lines extending from respective terminals of said symbolic representation to respective edges of said front face, schematically indicating connections to and from said component, a pair of the engageable electrical members of each module unit being spaced to engage the contact regions of two junctions of said panel member with their front faces in a common plane and said edges in abutting relationship for providing a connected circuit including said components and for providing a schematic diagram in said plane of said circuit, and an engageable electrical member of at least one of said module units being positioned to engage one of said jumper contacts for providing connection to said jumper.

9. A visual educational device for teaching information about electrical circuits and components comprising a substantially flat panel member, including a plurality of spaced electrical junctions in a modular pattern, means for electrically insulating said junctions one from another, each of said junctions including four interconnected engageable contacts which are positioned at the respective corners of a square pattern, a first plurality of jumper contacts at spaced points of said panel member, first conductor means interconnecting said first jumper contacts, a second plurality of jumper contacts at spaced points of said panel member, second conductor means interconnecting said second jumper contacts, a plurality of module units each including an electrical circuit component having its terminals electrically connected to a plurality of electrical contact elements selectively spaced on the rear of the module unit for engagement with the contacts of a plurality of said junctions, each module unit including a substantially flat front face, a symbolic representation on the front face identifying the electrical component in the module unit, and lines extending from each symbolic representation to corresponding points on the edges of each of said front faces for simultaneously constructing a circuit and a schematic diagram of said circuit in the plane of said front faces when the contact members of said module units are engaged with the contact elements of said junctions with said module units in abutting relationship on said panel member, and contact elements on the rear of at least one module unit for engaging one of said jumper contacts.

(References on following page)

References Cited by the Examiner

UNITED STATES PATENTS

| | | | |
|---|---|---|---|
| Re. 19,238 | 7/34 | Burke | 35—27 |
| 2,069,171 | 1/37 | Merkel | 200—51.1 |
| 2,374,800 | 5/45 | Bohlke | 35—19 |
| 2,568,535 | 9/51 | Ballard | 35—19 |
| 2,756,485 | 7/56 | Abramson | 39—155.5 |
| 2,878,587 | 3/59 | Jubenville | 35—19 |
| 3,078,596 | 2/63 | Sweeton | 35—19.1 |

FOREIGN PATENTS

| | | |
|---|---|---|
| 275,225 | 11/27 | Great Britain. |
| 695,292 | 8/53 | Great Britain. |
| 480,404 | 4/53 | Italy. |

OTHER REFERENCES

Kingan: RCA Technical Notes (RCA TN No. 314), November 1959.

JEROME SCHNALL, *Primary Examiner.*

L. SMILOW, *Examiner.*